(12) United States Patent
Heo et al.

(10) Patent No.: US 9,253,407 B2
(45) Date of Patent: Feb. 2, 2016

(54) DIGITAL PHOTOGRAPHING APPARATUS, METHOD OF CONTROLLING THE SAME, AND COMPUTER-READABLE RECORDING MEDIUM

(71) Applicant: SAMSUNG ELECTRONICS CO., LTD., Suwon-si, Gyeonggi-do (KR)

(72) Inventors: Jung-ah Heo, Seoul (KR); Se-hyun Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/656,369

(22) Filed: Mar. 12, 2015

(65) Prior Publication Data

US 2015/0189189 A1    Jul. 2, 2015

Related U.S. Application Data

(62) Division of application No. 13/552,829, filed on Jul. 19, 2012, now abandoned.

(30) Foreign Application Priority Data

Sep. 30, 2011 (KR) ........................ 10-2011-0100319

(51) Int. Cl.
| | |
|---|---|
| *H04N 5/222* | (2006.01) |
| *H04N 5/232* | (2006.01) |
| *G06F 3/0482* | (2013.01) |
| *G06F 3/0484* | (2013.01) |
| *H04N 5/262* | (2006.01) |
| *G06F 3/0488* | (2013.01) |

(52) U.S. Cl.
CPC .......... *H04N 5/23293* (2013.01); *G06F 3/0482* (2013.01); *G06F 3/04845* (2013.01); *G06F 3/04883* (2013.01); *H04N 5/23216* (2013.01); *H04N 5/262* (2013.01); *G06F 3/04886* (2013.01); *H04N 5/23209* (2013.01)

(58) Field of Classification Search
CPC .......... H04N 5/23209; H04N 5/23216; H04N 5/23293; H04N 5/262; H04N 5/772; G06F 3/0482; G06F 3/04845; G06F 3/04883; G06F 3/04886
USPC .............................. 348/207.99, 222.1, 229.1, 348/333.01–333.13, 362, 363; 396/137, 396/281, 290, 292, 296
See application file for complete search history.

(56) References Cited

U.S. PATENT DOCUMENTS

| | | |
|---|---|---|
| 7,417,679 B2 | 8/2008 | Kuruma |
| 7,889,246 B2 | 2/2011 | Fujio et al. |
| 8,605,188 B2 | 12/2013 | Ishihara et al. |

(Continued)

FOREIGN PATENT DOCUMENTS

| | | |
|---|---|---|
| JP | 2007-110434 A | 4/2007 |
| JP | 2010-183477 A | 8/2010 |
| JP | 2010-204844 A | 9/2010 |

OTHER PUBLICATIONS

Sony Corporation, Sony A230 Digital Single Lens Reflex Camera Instruction Manual, pp. 33-40, 61-66, 118 (2009).

*Primary Examiner* — Nhan T Tran
*Assistant Examiner* — Chriss Yoder, III
(74) *Attorney, Agent, or Firm* — Drinker Biddle & Reath LLP

(57) ABSTRACT

A user interface (UI) is provided which displays a process in which photographing setting values change correspondingly, so that a user can easily recognize the changes of the photographing setting values. A UI is also provided through which a user can adjust all photographing setting values.

13 Claims, 15 Drawing Sheets

(56) References Cited

U.S. PATENT DOCUMENTS

| | | |
|---|---|---|
| 2009/0040332 A1 | 2/2009 | Yoshino et al. |
| 2009/0138827 A1* | 5/2009 | Van Os ............... G06F 3/04817 715/846 |
| 2011/0050923 A1 | 3/2011 | Nomura et al. |
| 2011/0072359 A1 | 3/2011 | So et al. |
| 2012/0017177 A1* | 1/2012 | Kim ................... G06F 3/04886 715/828 |

* cited by examiner

S702

S704

S802

S804

S806

SCREEN D

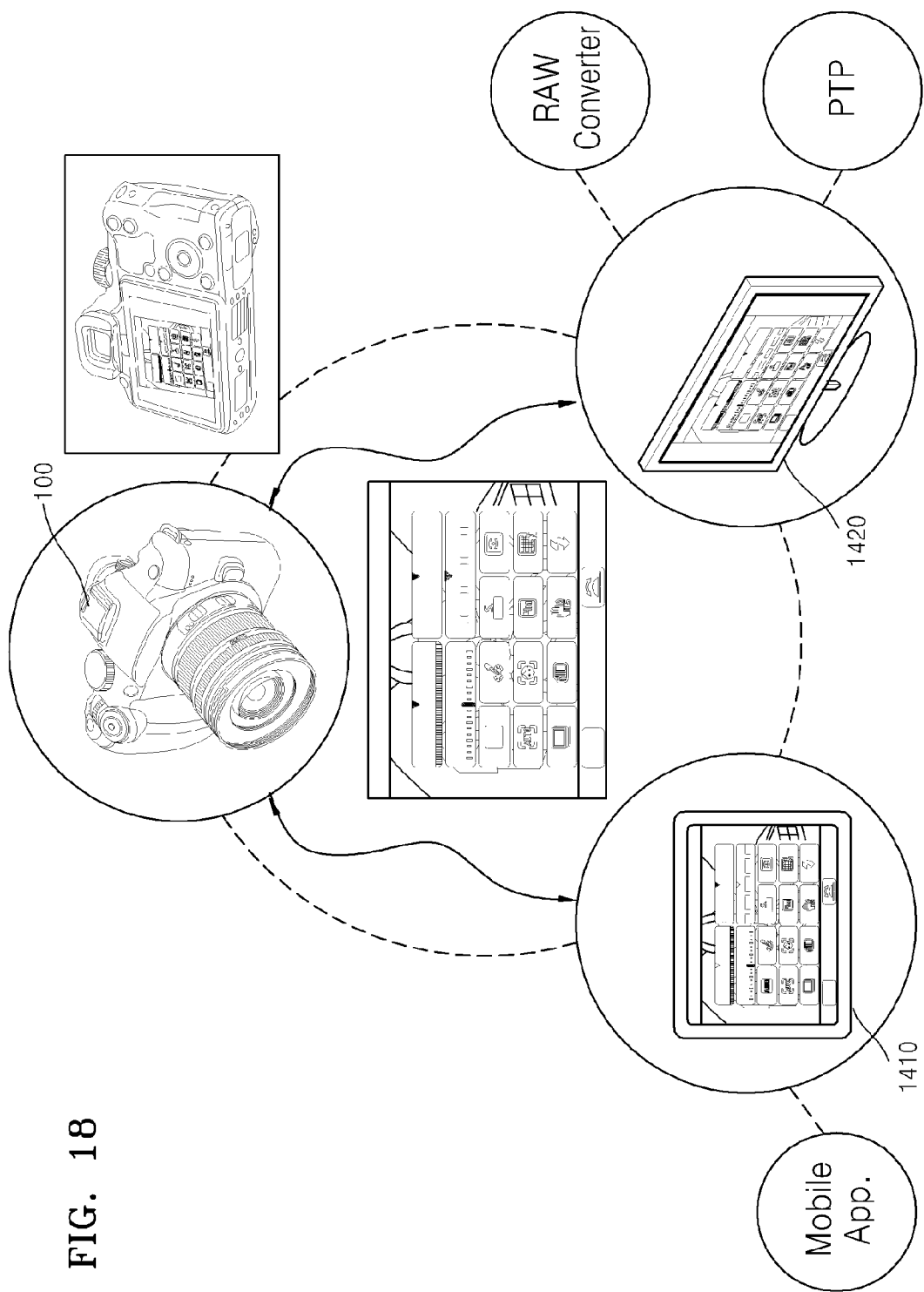

DIGITAL PHOTOGRAPHING APPARATUS, METHOD OF CONTROLLING THE SAME, AND COMPUTER-READABLE RECORDING MEDIUM

CROSS-REFERENCE TO RELATED PATENT APPLICATIONS

This application is a divisional of U.S. patent application Ser. No. 13/552,829 filed Jul. 19, 2012, which claims the benefit of Korean Patent Application No. 10-2011-0100319 filed Sep. 30, 2011 in the Korean Intellectual Property Office, the disclosures of which are incorporated herein in their entirety by reference.

BACKGROUND

Embodiments of the invention disclosed herein generally relate to a digital photographing apparatus, a method of controlling the same, and a computer-readable recording medium that stores computer program codes for executing the method.

Digital photographing apparatuses produce a captured image by receiving an optical signal and converting the optical signal to an electrical signal. A user may change photograph setting values, photographic effects, and the like of a digital photographing apparatus to apply desired setting values and effects to a captured image. Recently, a user interface for adjusting photograph setting values is provided in digital photographing apparatuses.

Japanese Patent Publication No. 2007-110434 ("the '434 Publication") relates to a photographing condition setting device of a camera, and discloses a user interface that displays menu items for a plurality of photographing setting values. A user may select one from among the photographing setting values and adjust the selected photographing setting value by using a dial or the like. On this user interface, a user selects one menu item and adjusts a photographing setting value corresponding to the menu item.

Photographing setting values of a camera may be adjusted correspondingly with one another. For example, in an aperture priority mode, when a user adjusts an aperture value, a shutter speed value may also be automatically changed. However, conventionally, such as is disclosed in the '434 Publication, a user cannot recognize the changes of photographing setting values other than the photographing setting value that the user adjusts, so that the user has difficulty in manipulating a camera. Particularly, photographing setting values, such as a shutter speed, an aperture value, and the sensitivity of an image pickup device (an ISO value), which frequently operate correspondingly are only shown by simply displaying their current setting values. Thus, it is difficult for a user to know which photographing setting values change correspondingly and which photographing setting values are changing correspondingly.

SUMMARY

According to various embodiments of the invention, a user can easily recognize the photographing setting values that have changed correspondingly, to increase user convenience.

According to various embodiments, a user can recognize photographing setting values that can be set in a current mode and photographing setting values that cannot be set in the current mode.

According to various embodiments, a user interface (UI) through which a user can recognize and adjust all photographing setting values is provided.

According to an embodiment, there is provided a method of controlling a digital photographing apparatus, the method comprising: displaying on a preview image a plurality of first menu items that respectively show a plurality of numerical candidate setting values to set a plurality of first group photographing setting values respectively; and when a first group photographing setting value corresponding to the first menu item selected by a user is changed, changing and displaying at least one other first group photographing setting value which is correspondingly changed with the changed first group photographing setting value, wherein the plurality of numeral candidate setting values are displayed as a sequential list.

According to an embodiment, there is provided a method of controlling a digital photographing apparatus, the method comprising: providing, on a preview image, menu items that enable photographing setting values to be set, display a current photographing setting value, and are arranged in a lattice shape; deactivating at least some of the menu items according to the current mode so that a user cannot adjust the at least some menu items; and adjusting the photographing setting values of the menu items according to a user input.

According to an embodiment, there is provided a digital photographing apparatus comprising: a user interface (UI) provider which provides menu items for setting photographing setting values to a preview image; and a photographing unit which adjusts the photographing setting values of the menu items according to a user input. The UI provider provides on a preview image a plurality of first menu items that enable a plurality of first group photographing setting values each having numerically-displayed candidate setting values to be set and that correspondingly change so that another first group photographing setting value is automatically changed according to adjustment of a first group photographing setting value. When a first group photographing setting value selected by a user from among the plurality of first group photographing setting values is changed, the UI provider changes another first group photographing setting value correspondingly with the first group photographing setting value selected by the user. When the selected first group photographing setting value and the other first group photographing setting value, which correspondingly changes, are changed, the UI provider displays a process in which first menu items corresponding to the changed first group photographing setting values are changed. Each of the plurality of first menu items is configured as a sequential list of a plurality of candidate setting values of the first group photographing setting value that is set through the each of the first menu items.

According to an embodiment, there is provided a digital photographing apparatus comprising: a user interface (UI) provider which provides, on a preview image, menu items that enable photographing setting values to be set, display current photographing setting values, and are arranged in a lattice shape; and a photographing unit which adjusts the photographing setting values of the menu items according to a user input, wherein the UI provider is configured to deactivate at least some of the menu items according to the current mode so that a user cannot adjust the at least some menu items, and to adjust the photographing setting values of the menu items according to a user input.

According to an embodiment, there is provided a computer-readable recording medium for storing computer program codes for executing a method of controlling a digital photographing apparatus, the method comprising: providing on a preview image a plurality of first menu items that enable a plurality of first group photographing setting values each having numerically-displayed candidate setting values to be set and that correspondingly change so that another first group photographing setting value is automatically changed according to adjustment of a first group photographing setting value; when a first group photographing setting value selected by a user from among the plurality of first group photographing setting values is changed, changing another first group photographing setting value correspondingly with the first group photographing setting value selected by the user; and when the selected first group photographing setting value and the other first group photographing setting value, which correspondingly changes, are changing, displaying a process in which first menu items corresponding to the changed first group photographing setting values are changed, wherein each of the plurality of first menu items is configured as a sequential list of a plurality of candidate setting values of the first group photographing setting value that is set through the each of the first menu items.

According to an embodiment, there is provided a computer-readable recording medium for storing computer program codes for executing a method of controlling a digital photographing apparatus, the method comprising: providing, on a preview image, menu items that enable photographing setting values to be set, display a current photographing setting value, and are arranged in a lattice shape; deactivating at least some of the menu items according to the current mode so that a user cannot adjust the at least some menu items; and adjusting the photographing setting values of the menu items according to a user input.

According to an embodiment, there is provided a method of controlling a digital photographing apparatus, the method comprising: displaying on a preview image a plurality of menu items each showing a plurality of numerically-displayed candidate setting values for setting each of a plurality of first group photographing setting values; and when a first group photographing setting value corresponding to a first menu item selected from the plurality of menu items by a user is changed, changing at least one first group photographing setting value correspondingly with the selected first group photographing setting value and displaying the changed at least one first group photographing setting value, wherein the plurality of numerically-displayed candidate setting values are sequentially listed and displayed.

BRIEF DESCRIPTION OF THE DRAWINGS

The above and other features and advantages of the invention will become more apparent by describing in detail exemplary embodiments thereof with reference to the attached drawings in which:

FIG. 18 is a pictorial diagram illustrating a process in which UIs are engaged with one another by a UI engaging unit included in the CPU/DSP illustrated in FIG. 17.

DETAILED DESCRIPTION

The following description and drawings are referred to in order to gain a sufficient understanding of the invention, and matters that can be easily implemented by one of ordinary skill in the art to which this invention belongs may not be described in detail.

Also, the following description and drawings are not to be construed as limiting the invention, and the scope of the invention should be defined by the claims. Terms used herein should be interpreted as having a meaning that is consistent with the technical spirit of the invention, in order to most appropriately express the invention.

Various embodiments of the invention will now be described more fully with reference to the accompanying drawings. Expressions such as "at least one of," when preceding a list of elements, modify the entire list of elements and do not modify the individual elements of the list.

Figure 1:
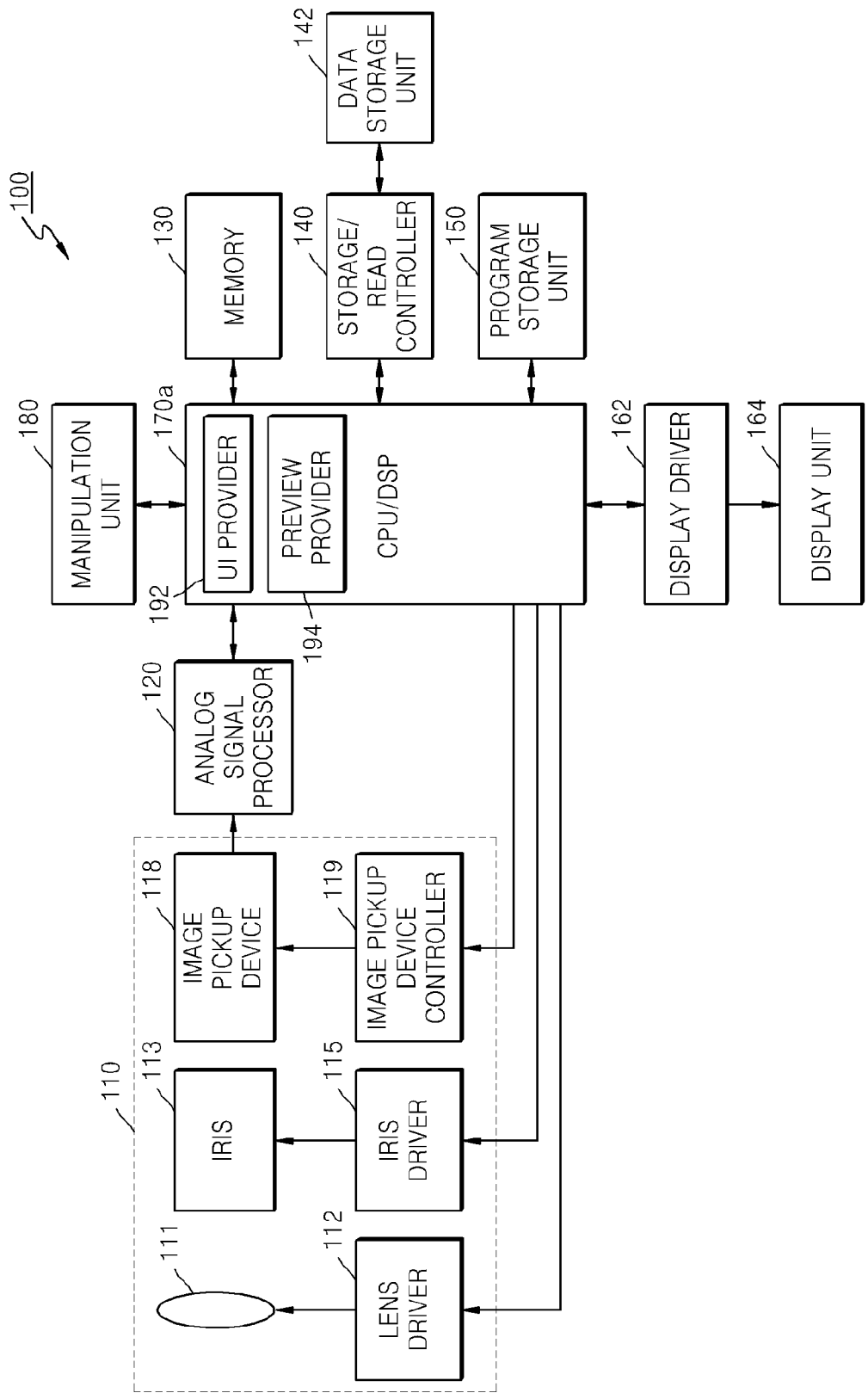
FIG. 1 is a block diagram of a digital photographing apparatus according to an embodiment of the invention.

FIG. 1 is a block diagram of a digital photographing apparatus 100 according to an embodiment of the invention.

Referring to FIG. 1, the digital photographing apparatus 100 may include a photographing unit 110, an analog signal processor 120, a memory 130, a storage/read controller 140, a data storage unit 142, a program storage unit 150, a display driver 162, a display unit 164, a central processing unit (CPU)/digital signal processor (DSP) 170a, and a manipulation unit 180.

The CPU/DSP 170a controls overall operation of the digital photographing apparatus 100. The CPU/DSP 170a provides a lens driver 112, an iris driver 115, and an image pickup device controller 119 with control signals for the operations of the lens driver 112, the iris driver 115, and the image pickup device controller 119.

The photographing unit 110 is a component for generating an electrical signal representative of incident light and includes a lens 111, the lens driver 112, an iris 113, the iris driver 115, an image pickup device 118, and the image pickup device controller 119.

The lens 111 may include groups of lenses. A position of the lens 111 is controlled by the lens driver 112. The lens driver 112 controls a position of the lens 111 according to a control signal provided from the CPU/DSP 170a.

A degree of openness/closeness of the iris 113 is controlled by the iris driver 115, thereby controlling the amount of light incident on the image pickup device 118.

An optical signal transmitted through the lens 111 and the iris 113 forms an image of an object on a light-receiving side of the image pickup device 118. The image pickup device 118 may be a Charge-Coupled Device (CCD) image sensor or a Complementary Metal-Oxide Semiconductor Image Sensor (CIS) that converts an optical signal to an electrical signal. The sensitivity or the like of the image pickup device 118 can be controlled by the image pickup device controller 119. The image pickup device controller 119 controls the image pickup device 118 according to a control signal automatically generated by a real-time input image signal or a control signal manually input by a user via the manipulation unit 180.

A shutter (not shown) controls a light-exposure time of the image pickup device 118.

Examples of the shutter include a mechanical shutter for adjusting the incidence of light by moving a screen and an electronic shutter for controlling light-exposure by providing an electrical signal to the image pickup device 118. The analog signal processor 120 may perform noise reduction, gain adjustment, waveform standardization, analog-to-digital conversion (ADC), etc., on an analog signal generated and provided from the image pickup device 118.

A signal output from the analog signal processor 120 may be input to the CPU/DSP 170a directly or via the memory 130. Herein, the memory 130 operates as a main memory of the digital photographing apparatus 100 and temporarily stores information necessary for an operation of the CPU/DSP 170a. The program storage unit 150 stores programs, such as an operating system for driving the digital photographing apparatus 100 and an application system.

The digital photographing apparatus 100 includes the display unit 164 for displaying an operation state of the digital photographing apparatus 100 or information regarding an image captured by the digital photographing apparatus 100. The display unit 164 may provide visual information and/or auditory information to the user. To provide the visual information, the display unit 164 may include, for example, a Liquid Crystal Display (LCD), or an Organic Light Emitting Display (OLED). The display unit 164 may be a touch screen for recognizing a touch input.

The display driver 162 generates and provides a driving signal to the display unit 164.

The CPU/DSP 170a processes an input image signal and controls corresponding components of the digital photographing apparatus 100 according to the processed image signal or an input signal from the outside. The CPU/DSP 170a may reduce noise of input image data and perform image signal processing for image quality improvement such as gamma correction, color filter array interpolation, color transforms, color correction, and color enhancement. In addition, the CPU/DSP 170 may generate an image file by compressing image data obtained by the image signal processing for image quality improvement or restore the image data from the image file. A compression format of an image may be a lossless format or a lossy format. Examples of a proper format for a still image may include a Joint Photographic Experts Group (JPEG) format and a JPEG 2000 format. In addition, when a moving picture is recorded, a video file may be generated by compressing a plurality of frames according to the Moving Picture Experts Group (MPEG) standard. An image file may be generated, for example, in accordance with the Exchangeable image file format (Exif) standard.

The image data output from the CPU/DSP 170a is input to the storage/read controller 140 directly or via the memory 130, wherein the storage/read controller 140 stores the image data in the data storage unit 142 automatically or according to (e.g., in response to) a signal from the user. The storage/read controller 140 may read data regarding an image from an image file stored in the data storage unit 142 and provide the read data to the display driver 162 via the memory 130 or another path to display an image on the display unit 164. The data storage unit 142 may be detachably installed on the digital photographing apparatus 100.

The CPU/DSP 170a may also perform obscurity processing, color processing, blur processing, edge emphasis processing, image analysis processing, image recognition processing, image effect processing, etc. Face recognition, scene recognition, or the like may be performed as the image recognition processing. The CPU/DSP 170a may also perform display image signal processing to display an image on the display unit 164. For example, brightness level adjustment, color correction, contrast adjustment, contour emphasis adjustment, screen division, creation of a character image and the like, and image synthesis may be performed. The CPU/DSP 170a may be connected to an external monitor, perform predetermined image signal processing so that an image is displayed on the external monitor, and transmit processed image data to the external monitor so that a corresponding image is displayed on the external monitor.

In addition, the CPU/DSP 170a may generate control signals for controlling, for example, auto focusing (AF), a zoom change, a focus change, and auto exposure (AE) correction, by executing programs stored in the program storage unit 150 or using a separate module, provide the control signals to the iris driver 115, the lens driver 112 and the image pickup device controller 119, and generally control operations of components of the digital photographing apparatus 100, such as a shutter and a strobe.

Through the manipulation unit 180, the user can input a control signal. The manipulation unit 180 may include various functional buttons, such as a shutter-release button for inputting a shutter-release signal to take a picture by exposing the image pickup device 118 to light for a predetermined period of time, a power button for inputting a control signal to control power ON/OFF, a zoom button for widening or narrowing a viewing angle, a mode selection button, and other photograph setting value adjustment buttons. The manipulation unit 180 may be implemented by any way of enabling a user to input a control signal, for example, by a button, a keyboard, a touch pad, a touch screen, and a remote controller.

The CPU/DSP 170a according to an embodiment of the invention may include a user interface (UI) provider 192 and a preview provider 194.

The UI provider 192 provides UIs according to embodiments of the invention. The UI provider 192 may provide a UI as a UI screen on the display unit 164. UIs may be controlled by a user input to the manipulation unit 180. The user input made to the manipulation unit 180 may be at least one of a key input, a touch screen input, a motion input, and a voice input, or a combination thereof.

The preview provider 194 generates a preview from an image pickup signal received from the photographing unit 110 and the analog signal processor 120, and provides the preview on the display unit 164.

Figure 2:
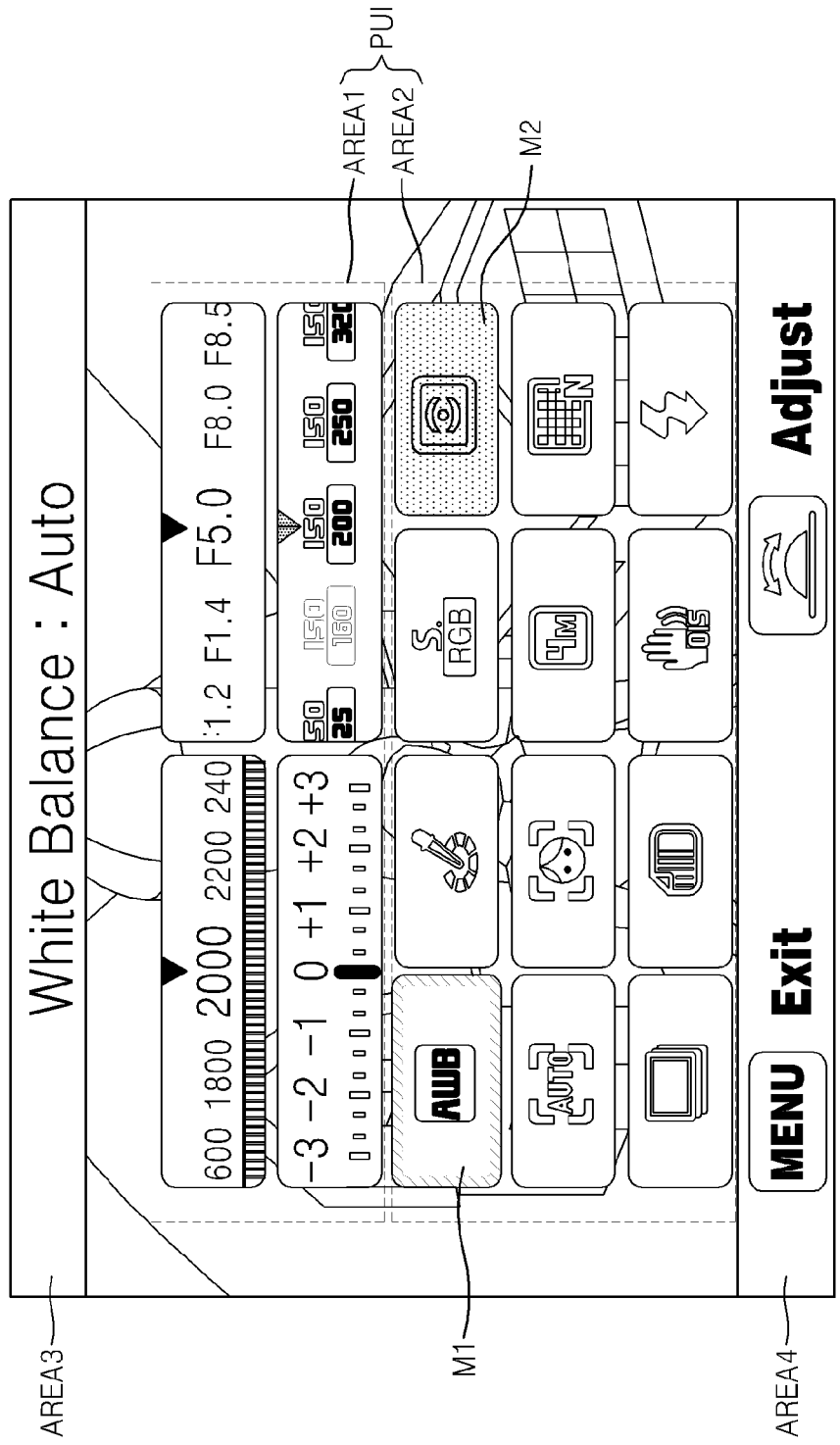
FIG. 2 is an exemplary screen shot on a user interface (UI) screen according to an embodiment.

FIG. 2 illustrates a UI screen according to an embodiment of the invention.

Referring to FIG. 2, a UI includes a first area AREA1, a second area AREA2, a third area AREA3, and a fourth area AREA4. Menu items arranged in a lattice (or grid) arrangement in each of the first area AREA1 and the second area AREA2 constitute a user interface PUI.

According to the present embodiment, the menu items may be displayed in a semi-transparent state and thus a preview image and the menu items may be viewed simultaneously.

According to the present embodiment, first menu items may be arranged in the first area AREA1 and second menu items may be arranged in the second area AREA2.

The first menu items are menu items for changing first group photographing setting values that change correspondingly. For example, the first group photographing setting values may be selected from the group consisting of a shutter speed, an aperture value, a brightness correction value, and an image pickup device's sensitivity. The first menu items may sequentially list and show in an analog manner candidate setting values of the first group photographing setting values that are represented numerically. For example, as illustrated in FIG. 2, a shutter speed, an aperture value (for example, an F number), a brightness correction value (for example, an EV value), and an image pickup device's sensitivity (for example, an ISO value) on the first menu items may be displayed as a list of a plurality of candidate setting values.

First group photographing setting values that change correspondingly may vary according to a current mode. For example, in an aperture priority mode, when a user adjusts an aperture value, a shutter speed may be automatically adjusted. When a user adjusts a brightness correction value, a shutter speed may be automatically adjusted. In a shutter speed priority mode, when a user adjusts a shutter speed, an aperture value may be automatically adjusted. When a user adjusts a brightness correction value, an aperture value may be automatically adjusted.

According to an embodiment of the invention, the first menu items may sequentially list and show in an analog manner the numerical candidate setting values of the first group photographing setting values, and may display a change of the first group photographing setting values so that a user can easily verify the changes of the first group photographing setting values that are made correspondingly.

In a UI according to the aforementioned '434 Publication, since a user may read only a current setting value of each photographing setting value, the user does not easily recognize the changes of photographing setting values that are made correspondingly. For example, while a user adjusts a shutter speed, the user may not recognize an automatic change of an aperture value. Accordingly, the user takes a picture without knowing what photographing setting values currently change correspondingly and what photographing setting values have been changed due to his or her own manipulation, so that the user may find it difficult to take a picture according to his or her intention.

However, according to an embodiment of the invention, a user may easily recognize what photographing setting values currently change correspondingly and what photographing setting values have been changed due to his or her own manipulation, so that the user may easily verify a manipulated state of the digital photographing apparatus 100 and take a picture according to his or her intention. In addition, according to the present embodiment, the user can dynamically recognize operations automatically performed by the digital photographing apparatus 100, and thus, may perceive the device as an intelligent digital photographing apparatus 100.

Moreover, according to an embodiment of the invention, when a photographing setting value of each first menu item changes, an effect of showing a process in which the photographing setting value changes may be maximized by displaying a process in which candidate setting values ranging between an initial value and a final value are sequentially displayed and the photographing setting value is changed to the final value. When a photographing setting value is changed, if the photographing setting value is only changed from an initial value to a final value, a user has difficulty in recognizing whether photographing setting values other than the photographing setting value changed by a user have been changed. However, according to an embodiment of the invention, the effect of showing to a user a process in which a photographing setting value is changing is maximized as described above, so that the user may easily recognize that photographing setting values are changed correspondingly.

According to an embodiment of the invention, the first menu items may list and show some of the candidate setting values of the first group photographing setting values. In this case, a user is able to adjust a first group photographing setting value while concretely recognizing its candidate setting values.

According to another embodiment of the invention, the first menu items may provide a list of all of the candidate setting values of the first group photographing setting values. In this case, a user may recognize the range of candidate setting values that can be currently set.

According to the present embodiment, the range of candidate setting values may vary according to the kind of hardware which is combined with the digital photographing apparatus 100. For example, when the digital photographing apparatus 100 is constructed with interchangeable lenses, the range of the candidate setting values of an aperture value and the range of the candidate setting values of a shutter speed may vary according to the type of lens which is coupled to the digital photographing apparatus 100, and thus, the ranges of candidate setting values to be provided to the first menu items may vary. According to the present embodiment, a user easily recognizes how candidate setting values change according to the replacement of hardware, to increase user convenience.

The second menu items are menu items for changing second group photographing setting values having selectable candidate setting values. The second menu items show currently set candidate setting values and do not show other candidate setting values. Photographing setting values set in the second menu items may be, for example, a white balance, a storage file format, a light measurement mode, auto-focusing, face recognition, burst shot, handshaking correction, a strobe, and the like.

The menu items may be activated or deactivated according to a currently set mode. For example, a shutter speed setting menu item may be deactivated in an aperture priority mode. According to an embodiment of the invention, a menu item deactivated in a current mode shows this deactivation by using a method, for example, by being displayed more blurred than activated menu items or displayed in a different color from the activated menu items. In the embodiment of FIG. 2, a light measurement mode setting menu item M2 is deactivated.

The photographing setting values respectively corresponding to the menu items are adjusted according to a user's input. According to an embodiment of the invention, current states of a plurality of photographing setting values are displayed on one screen so that a user can change several photographing setting values on one screen, whereby the user may conveniently adjust the photographing setting values.

In addition, referring to FIG. 2, when a user selects a specific menu item by moving a cursor on the UI, a description about the specific menu item is displayed on the third area AREA3. For example, as illustrated in FIG. 2, when a user selects an auto white balance setting menu item M1, a description about the auto white balance setting menu item M1, for example, White Balance, and a current setting value Auto are displayed on the third area AREA3. The user may directly change a selected photographing setting value on a current screen by referring to the description displayed on the third area AREA3.

When a user changes a photographing setting value, the photographing setting value changed by the user may be reflected on a preview image displayed together with the UI. To this end, the preview provider 194 performs image processing for reflecting the photographing setting value to the preview image, and provides a preview image as a result of the reflection to the display unit 164.

Moreover, according to an embodiment of the invention, a menu item button MENU for moving to another menu item, an exit button Exit for exiting from a current UI and displaying only a preview image, and other buttons may be provided to the fourth area AREA4 of the UI.

Figure 3:
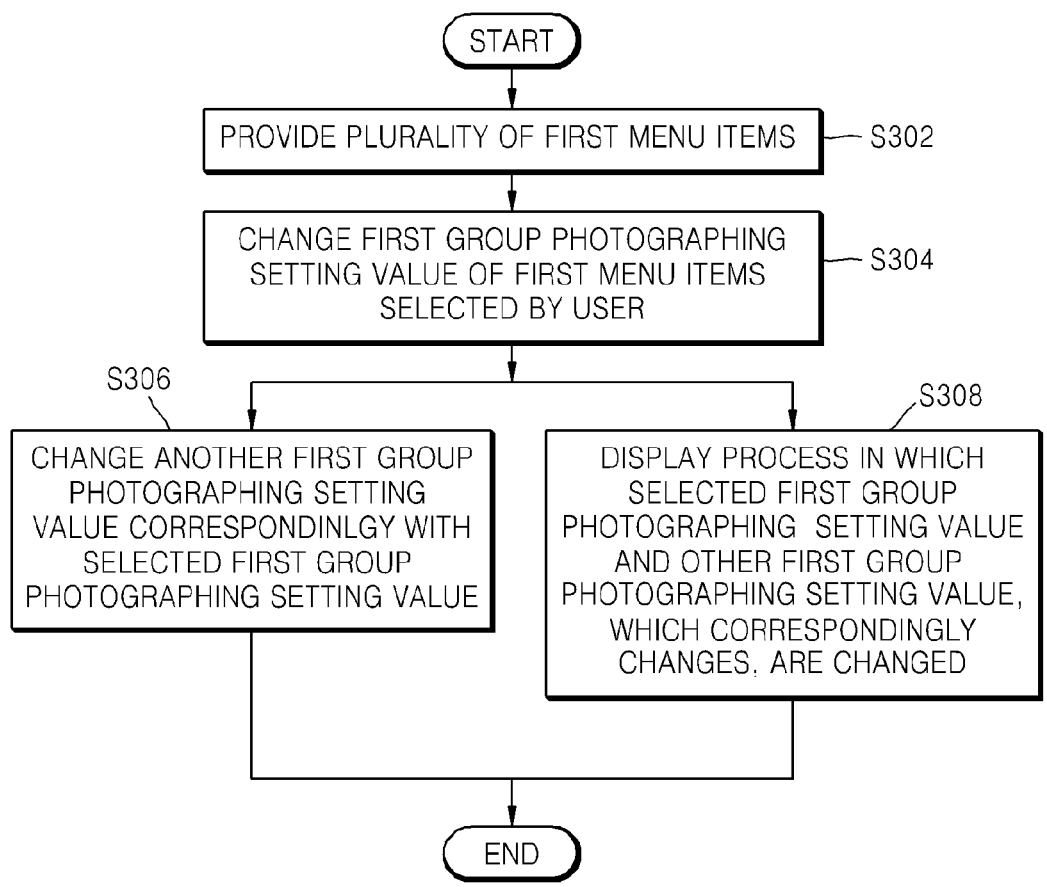
FIG. 3 is a flowchart of a digital photographing apparatus controlling method according to an embodiment.

FIG. 3 is a flowchart of a digital photographing apparatus controlling method according to an embodiment of the invention.

Referring to FIG. 3, in operation S302, the plurality of first menu items described above are provided. As described above, the first menu items may be provided as a sequential list of a plurality of candidate setting values that are represented numerically.

In operation S304, when a user input exists, a first group photographing setting value of a first menu item is changed according to the user input.

At this time, another first group photographing setting value that changes correspondingly with the first group photographing setting value changed by the user is also changed, in operation S306. In operation S308, a process in which the first group photographing setting value on the first menu item is changed by the user and a process in which the other first group photographing setting value, which changes correspondingly, is changed are displayed to the user. The process in which the first group photographing setting value is changed by the user may be displayed so that candidate photographing setting values between an initial value and a final value are sequentially displayed and the first group photographing setting value is changed to the final value by the user as described above.

Figure 4:
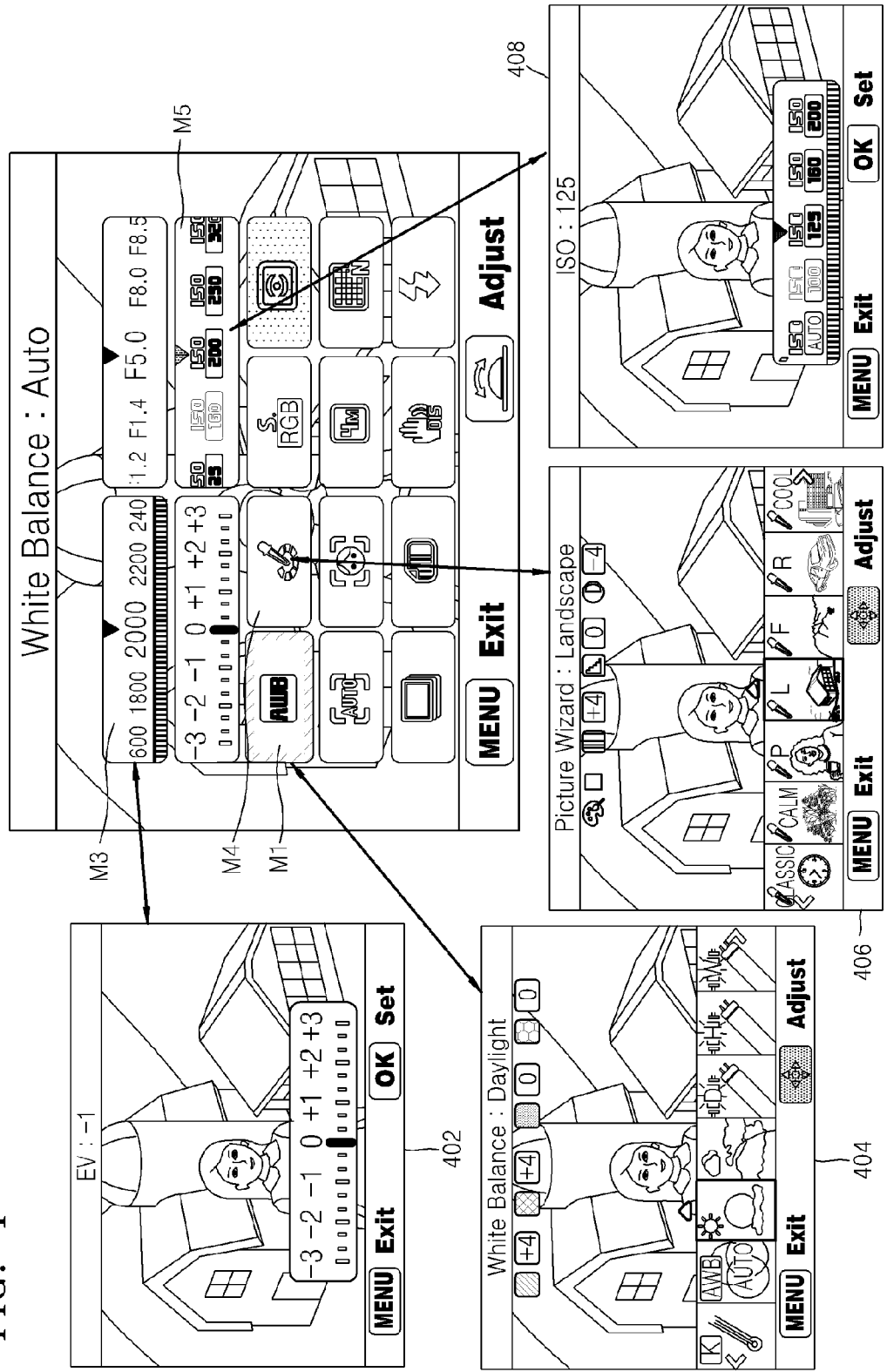
FIG. 4 includes exemplary screen shots illustrating a UI manipulating method according to an embodiment.

FIG. 4 illustrates a UI manipulating method according to an embodiment of the invention.

According to an embodiment of the invention, a user may select a method of adjusting a photographing setting value on a lattice-shaped UI or a method of adjusting a photographing setting value on a detailed screen that displays only the photographing setting value which is to be adjusted. For example, when a user selects the auto white balance setting menu item M1 and makes an input to enter into a detailed screen, a screen 404 displaying the candidate setting values of an auto white balance is provided. In this case, an image preview showing an image to which an auto white balance currently selected by the user is applied may also be provided. Various detailed screens such as a detailed screen 402 for an exposure value, a detailed screen 406 for a tone, and a detailed screen 408 for an ISO value may be provided according to a user's input.

Figure 5:
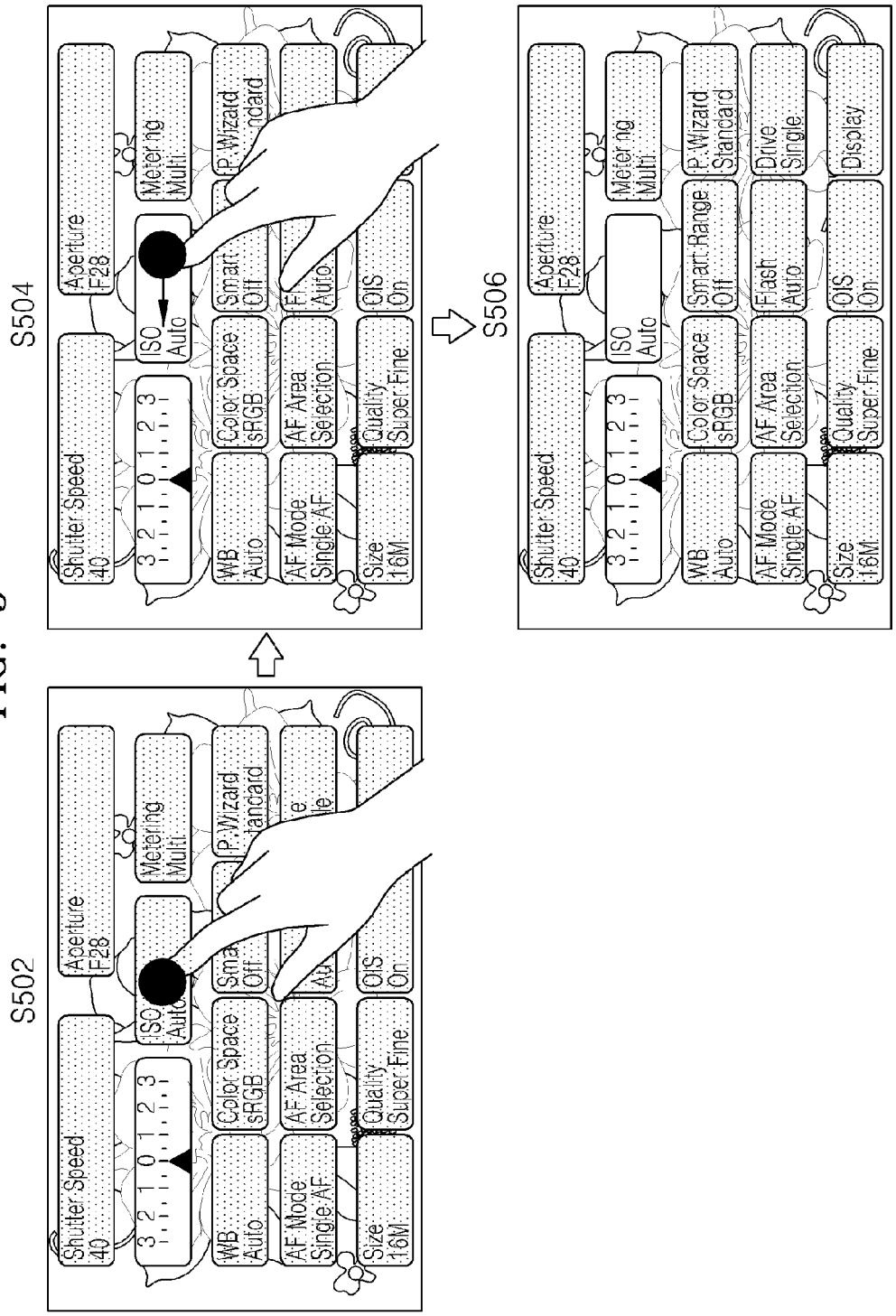
FIG. 5 includes exemplary screen shots illustrating a UI manipulating method according to an embodiment.

FIG. 5 illustrates a UI manipulating method according to another embodiment of the invention. According to the present embodiment, a user may manipulate the user interface PUI through a touch screen input. For example, the user may select a menu item through an input, such as by tapping or touching for a certain period of time or more, a menu item which is desired to be adjusted, in operation S502. Next, the user may adjust the photographing setting value corresponding to the selected menu item through an input such as dragging of the selected menu item, in operation S504. In operation S506, when setting of the selected menu item is concluded, the user may select another menu item or may terminate the manipulation of the selected menu item through an operation such as making no inputs for a certain period of time or more.

Figure 6:
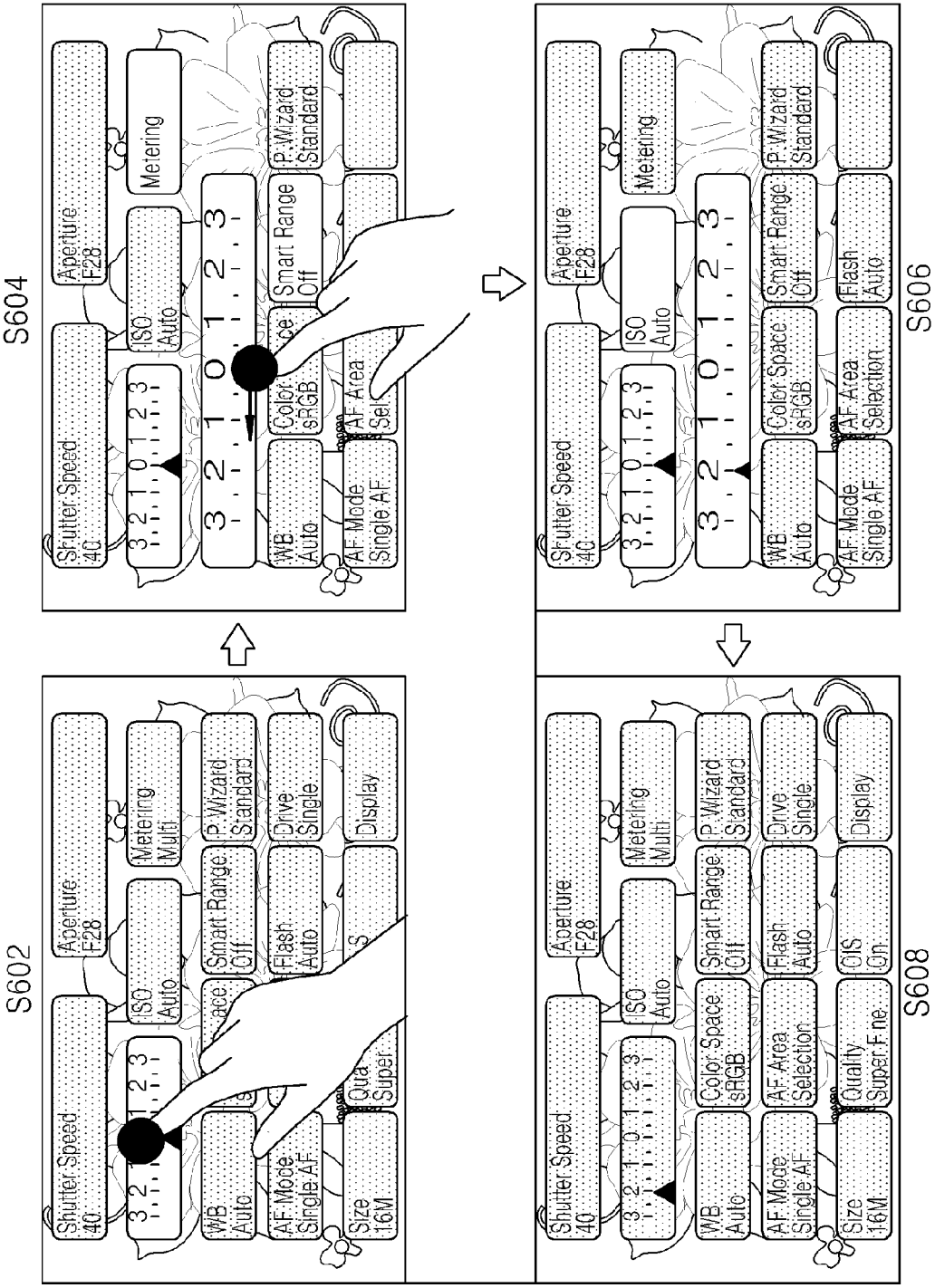
FIG. 6 includes exemplary screen shots illustrating a UI manipulating method according to an embodiment.

FIG. 6 illustrates a UI manipulating method according to another embodiment of the invention. According to the present embodiment, when a user selects one of the menu items in operation S602, the selected menu item is displayed magnified in operation S604. When a menu item manipulation made by the user is completed in operation S606, the magnified menu item returns back to its original state in operation S608. At this time, an arrangement of other menu items may be changed to magnify and display the selected menu item, in operations S604 and S606. According to the present embodiment, the user may more conveniently manipulate menu items since the user can see a menu item that the user desires to manipulate magnified. When menu items are manipulated by touch screen inputs, a user may touch undesired menu items due to small spaces allocated to the menu items, when the user manipulates a desired menu item. However, according to the present embodiment, since the user may manipulate a menu item through a touch screen input in a wide space, user convenience may be increased.

Figure 7:
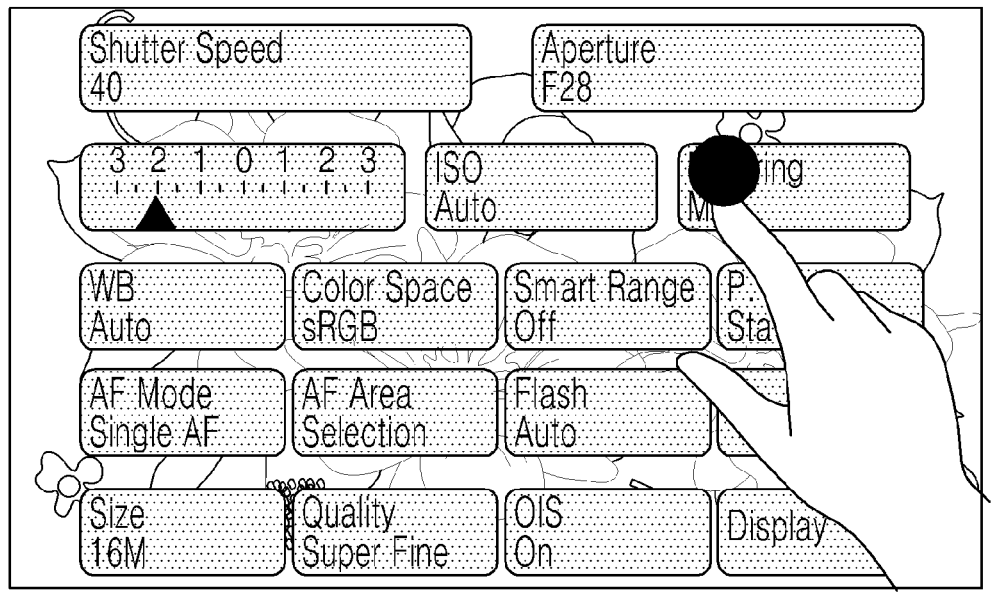
FIG. 7 includes exemplary screen shots illustrating a UI manipulating method according to an embodiment.
Figure 7:
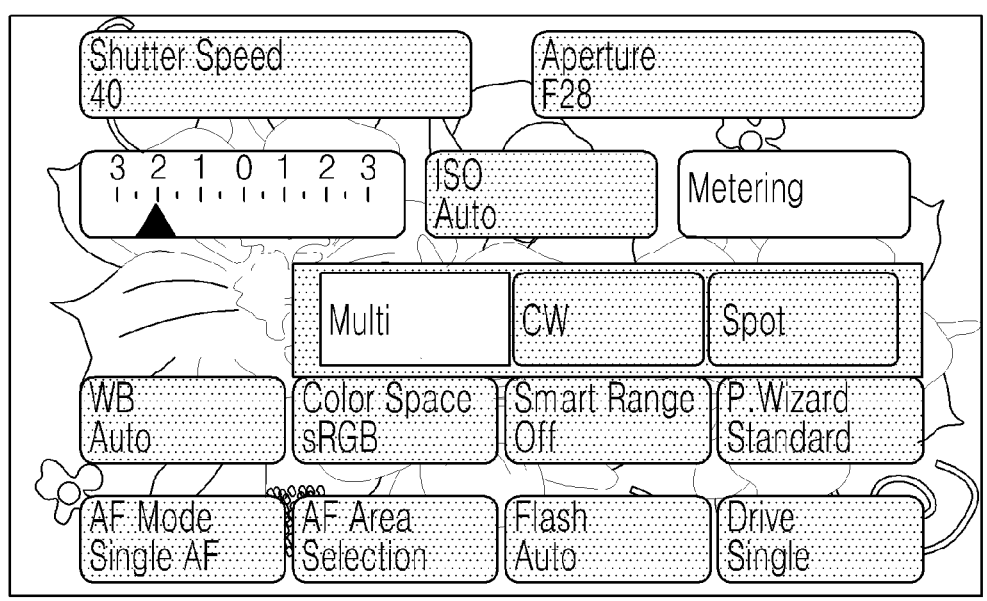

FIG. 7 illustrates a UI manipulating method according to another embodiment of the invention. According to the present embodiment, when a user selects one of the menu items in operation S702, hidden candidate setting values of the selected menu item are displayed on a screen so that the user may select one of the displayed candidate setting values, in operation S704. At this time, to display the hidden candidate setting values on the screen, an arrangement of other menu items may be changed. According to the present embodiment, while a user is not adjusting a menu item, only a small area is allocated to display only a current setting value, and, only when the user selects and adjusts the corresponding menu item, a wide area is allocated to display all candidate setting values of the corresponding menu item. Therefore, the restricted screen of the display unit 164 of the digital photographing apparatus 100 may be efficiently used. Moreover, when a user manipulates the user interface PUI through a touch screen input, the user may touch undesired menu items due to small spaces allocated to menu items on the user interface PUI when the user manipulates a desired menu item. However, according to the present embodiment, since the user may manipulate the menu item through a touch screen input in a wide space, and thus, user convenience may be increased. In addition, when the user selects and manipulates the corresponding menu item, all selectable candidate setting values are displayed so that user convenience is increased when the user selects one of the candidate setting values.

Figure 8:
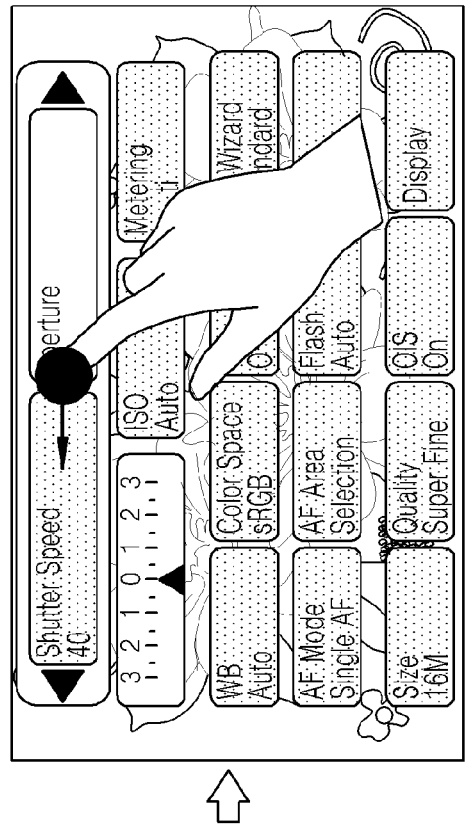
FIG. 8 includes exemplary screen shots illustrating a UI providing method according to an embodiment.
Figure 8:
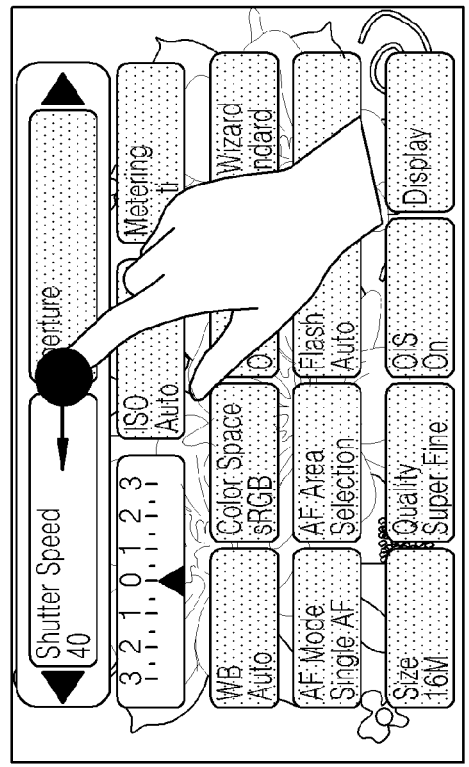
Figure 8:
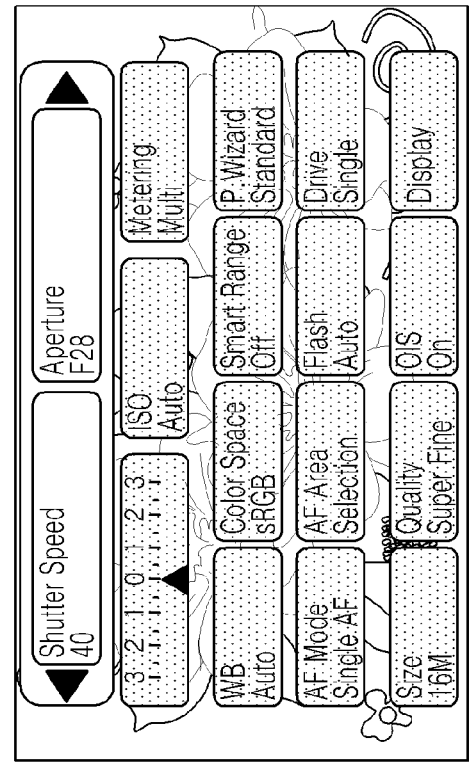

FIG. 8 illustrates a UI providing method according to an embodiment of the invention.

According to the present embodiment, at least two first menu items are grouped and controlled according to a current mode. For example, as illustrated in FIG. 8, a first menu item for adjusting a shutter speed and a first menu item for adjusting an aperture value are grouped and displayed and controlled together. According to the present embodiment, a method in which the shutter speed and the aperture value correspondingly change may vary according to modes. For example, in a program mode, the shutter speed and the aperture value may be grouped and controlled together through a single user input. In other words, the user selects a combination of the shutter speed and the aperture value. In operation S802, in a shutter speed priority mode, the first menu item for adjusting an aperture value is deactivated, and the first menu item for adjusting a shutter speed is activated, so that the aperture value may be automatically changed as the shutter speed is adjusted. In operation S804, in an aperture priority mode, the first menu item for adjusting a shutter speed is deactivated, and the first menu item for adjusting an aperture value is activated, so that the shutter speed may be automatically changed as the aperture value is adjusted. In operation S806, in a manual mode, the first menu items for adjusting a shutter speed and an aperture value are both activated, and the user may freely adjust each of the first menu items. The user may enter into the shutter speed priority mode through an input such as by tapping the first menu item for adjusting a shutter speed or by touching the first menu item for a shutter speed for a certain period of time or more. In addition, the user may enter into the manual mode or the program mode by using a specially allocated key input, a touch input, or the like.

According to the present embodiment, a user can easily recognize the photographing setting values adjusted correspondingly, to increase user convenience.

Figure 9:
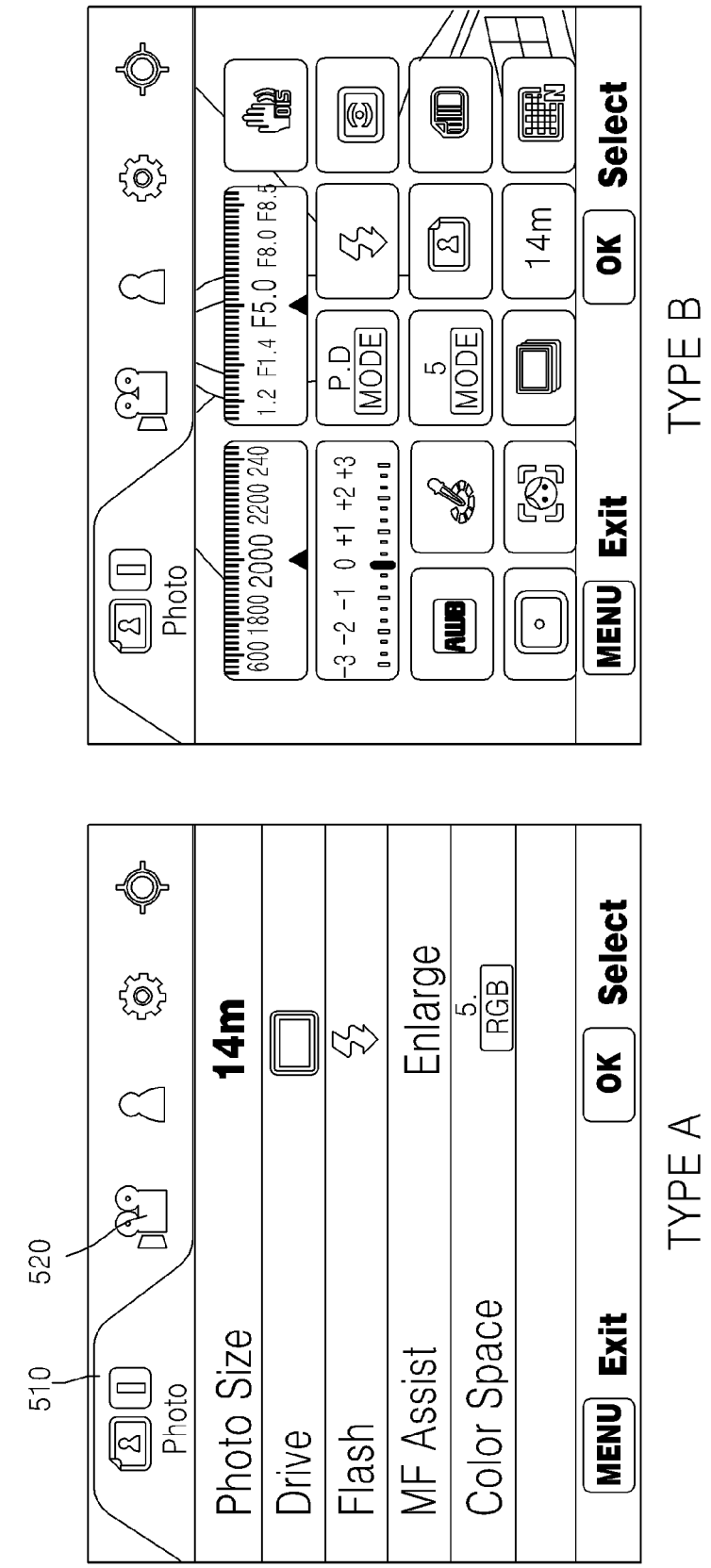
FIG. 9 includes exemplary screen shots illustrating a UI providing method according to an embodiment.

FIG. 9 illustrates a UI providing method according to another embodiment of the invention.

According to the present embodiment, a UI that divides setting values that can be set by a user into categories and provides menu items arranged in a lattice shape to each category may be provided. In this case, the user may select one from a UI having a list format (type A) and a UI having a lattice format (type B).

Tabs 510 and 520 representing the categories of the setting values may be provided to the UI, and the user may select one of the tabs 510 and 520 to access desired menu items.

Figure 10:
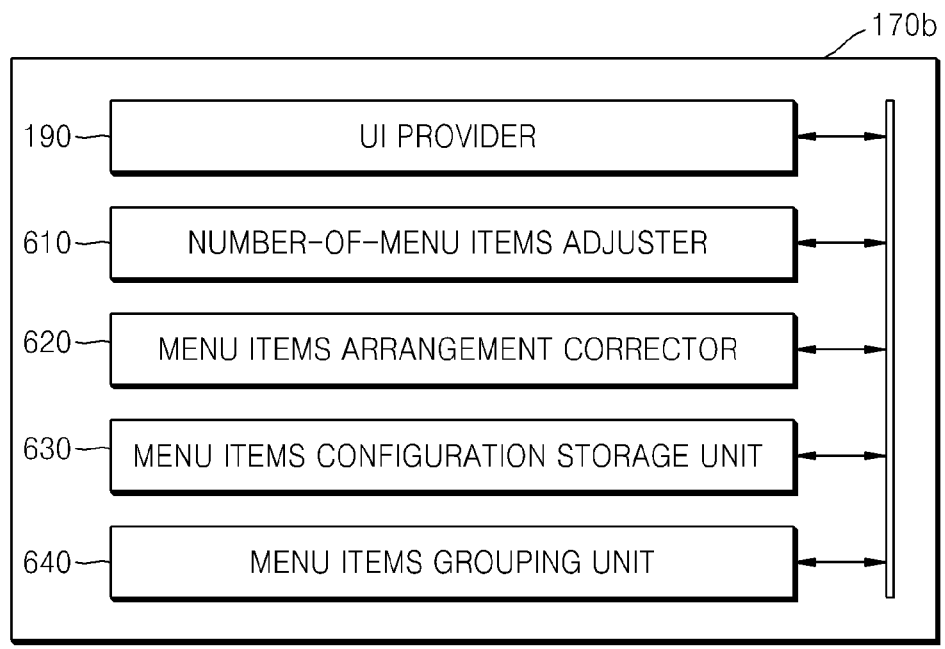
FIG. 10 is a block diagram of a central processing unit (CPU)/digital signal processor (DSP) according to an embodiment.

FIG. 10 is a block diagram of a CPU/DSP 170b according to another embodiment of the invention.

Referring to FIG. 10, the CPU/DSP 170b may include the UI provider 192, a number-of-menu items adjuster 610, a menu item arrangement corrector 620, a menu item configuration storage unit 630, and a menu item grouping unit 640.

Figure 11C:
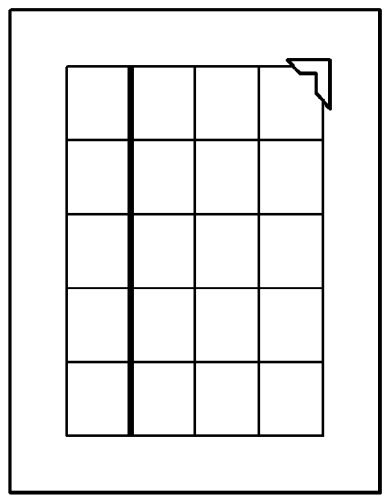
FIGS. 11A through 11C are pictorial diagrams illustrating an operation of a number-of-menu items adjuster included in the CPU/DSP illustrated in FIG. 10.
Figure 11B:
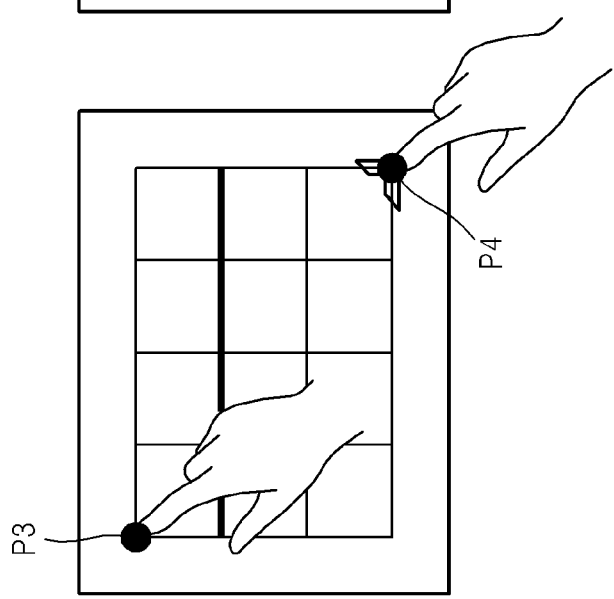
Figure 11A:
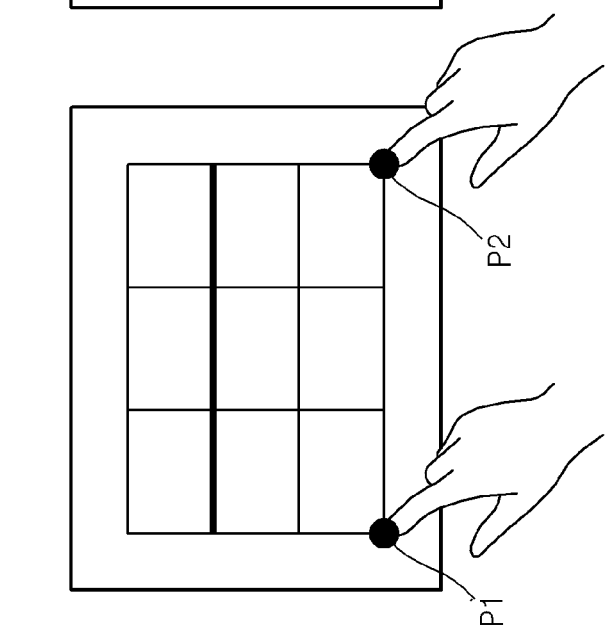

FIGS. 11A through 11C illustrate an operation of the number-of-menu items adjuster 610.

A user may adjust the number of menu items by dragging two corners of an outer edge of the menu items arranged in a lattice configuration. When a UI is controlled by a touch screen input, the user may adjust the number of menu items by touching and dragging two corners of the outer edge of the menu items arranged in a lattice configuration. When the UI is controlled by a key input, the user may adjust the number of menu items by selecting two corners of the outer edge of a lattice and moving at least one of the two corners.

FIG. 11A illustrates a case where corners P1 and P2 located on the same horizontal line from among four corners of a lattice in which menu items are arranged are dragged in opposite directions to increase the number of rows of the menu items as illustrated in FIG. 11B. Referring to FIG. 11B, corners P3 and P4 located along a diagonal line from among the four corners of the lattice are dragged in opposite directions to increase both the numbers of rows and columns of the menu items as illustrated in FIG. 11C.

The menu item arrangement corrector 620 may change the area of a specific menu item, delete the specific menu item, or change the location of the specific menu item, according to a user input.

Figure 12:
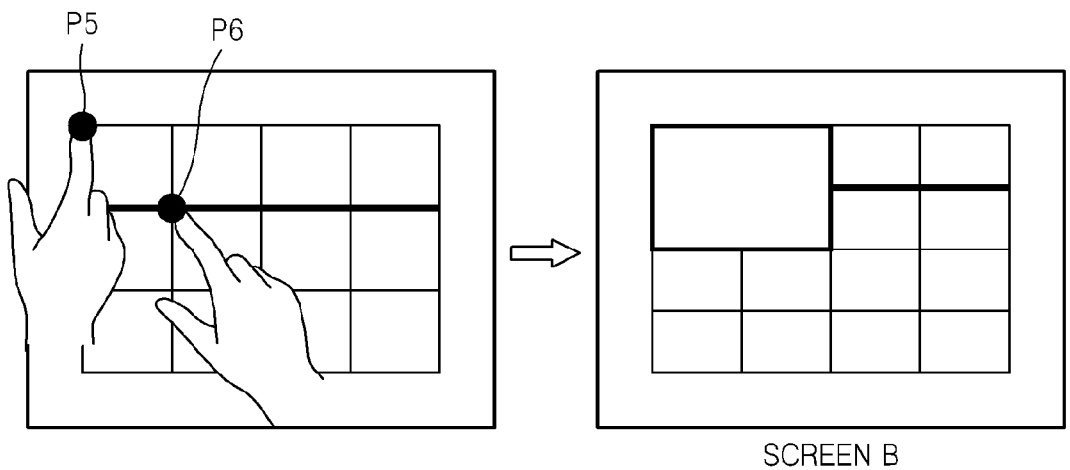
FIG. 12 includes pictorial diagrams illustrating an operation of changing the size of a specific menu item.

FIG. 12 illustrates an operation of changing the size of a specific menu item. A user may magnify or reduce the size of the specific menu item by dragging two corners P5 and P6 of the specific menu item in opposite directions. When the user changes the size of the specific menu item as described above, an arrangement of the other menu items and the sizes thereof are changed as shown in the right SCREEN B.

Figure 13:
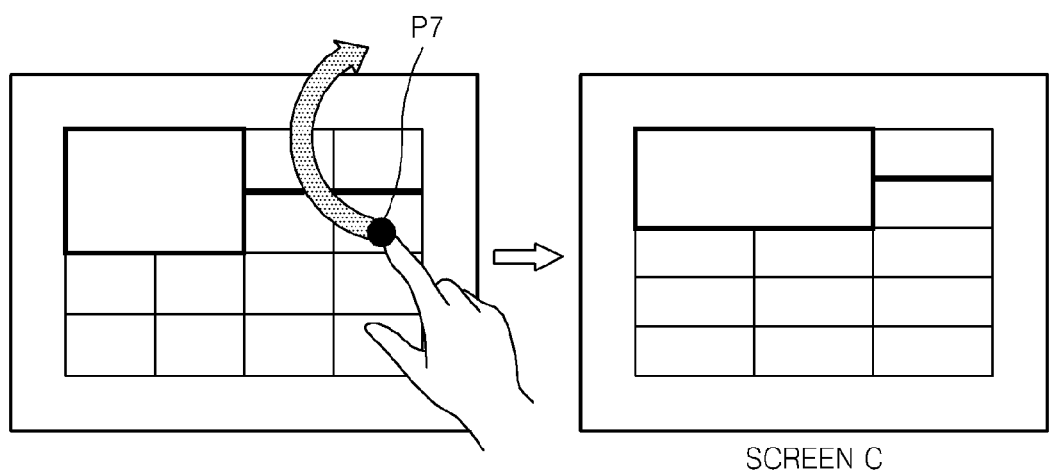
FIG. 13 includes pictorial diagrams illustrating an operation of deleting a specific menu item.

FIG. 13 illustrates an operation of deleting a specific menu item. A user may select a specific menu item from the menu items and delete the selected specific menu item by a gesture of moving the specific menu item to the outside of the lattice. For example, the user may delete the specific menu item by assuming a gesture of touching a position P7 on the specific menu item and moving the touched position P7 to the outside of the lattice. Alternatively, the user may delete the specific menu item by clicking the position P7 on the specific menu item and moving the clicked position P7 to the outside of the lattice. When the user deletes the specific menu item as described above, an arrangement of the remaining menu items and the sizes thereof are changed as shown in the right SCREEN C.

Figure 14:
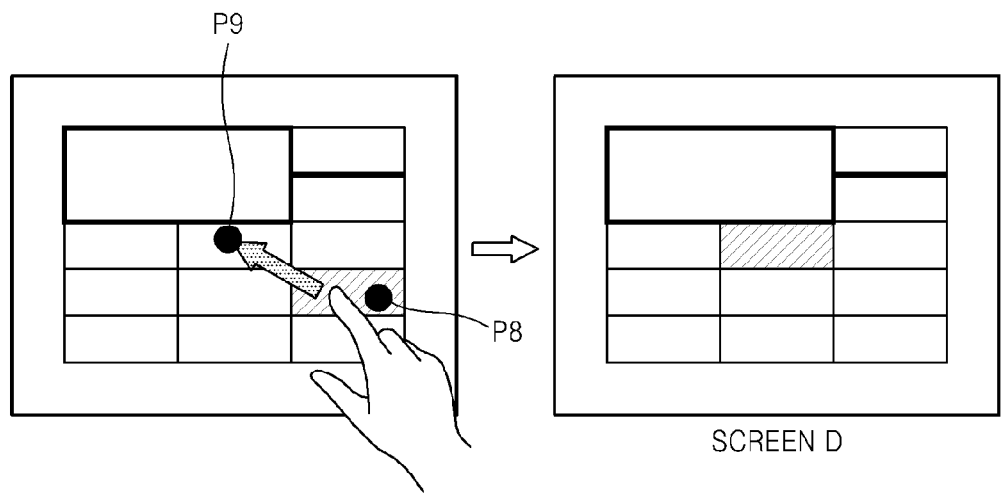
FIG. 14 includes pictorial diagrams illustrating an operation of moving the location of a specific menu item.

FIG. 14 illustrates an operation of moving a specific menu item. A user may select the specific menu item and change the location of the selected specific menu item by a gesture of moving the specific menu item to another location on the lattice. For example, the user may move the specific menu item to a second position P9 on the lattice by assuming a gesture of touching a first position P8 on the specific menu item and moving the touched position P8 to the second position P9. Alternatively, the user may move the specific menu item to the second position P9 by assuming a gesture of clicking the first position P8 on the specific menu item and moving the clicked position P8 to the second position P9.

When the user moves the specific menu item as described above, the location of the specific menu item is changed and the other menu items are relocated as shown in the right SCREEN D. According to an embodiment of the invention, a menu item originally arranged at the second position P9 may be moved to the first position P8. According to another embodiment of the invention, an arrangement of menu items around the specific menu item may be changed according to a predetermined rule.

The menu item configuration storage unit 630 may store a lattice-type arrangement of the menu items. A user may give an attribute such as a name to the corresponding lattice-type arrangement.

Figure 15:
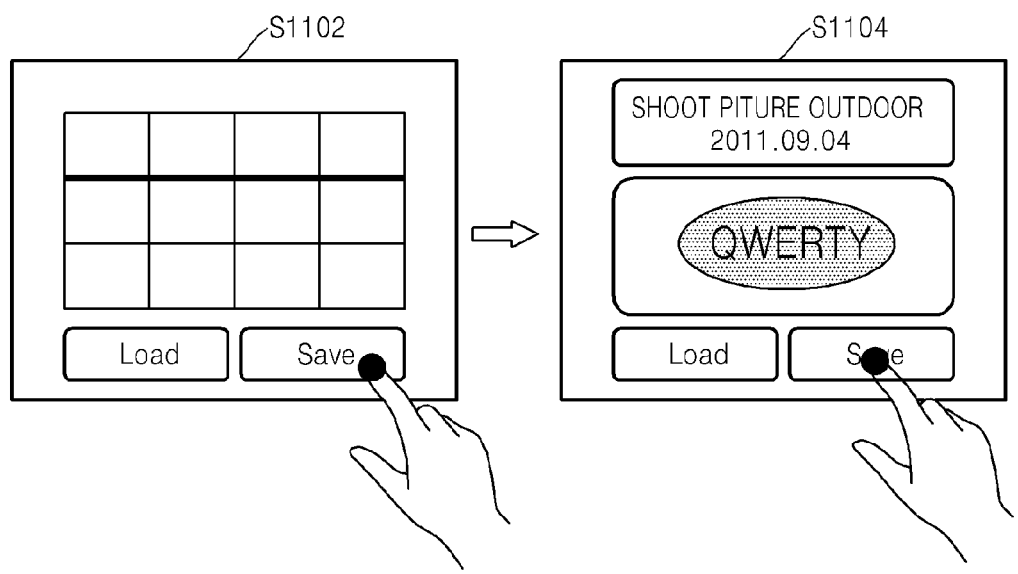
FIG. 15 includes pictorial diagrams illustrating an operation of storing a configuration of menu items.

FIG. 15 illustrates an operation of storing an arrangement of menu items.

As illustrated in FIG. 15, a user corrects an arrangement of the menu items in a UI and then selects a storage button Save to store the corrected arrangement, in operation S1102. At this time, the user may give an attribute such as a name to the corrected arrangement by using a keyboard or the like and store the corrected arrangement with the attribute, in operation S1104.

The menu item grouping unit 640 groups some of the menu items arranged in a lattice shape, according to a gesture of drawing a loop around the some menu items.

Figure 16:
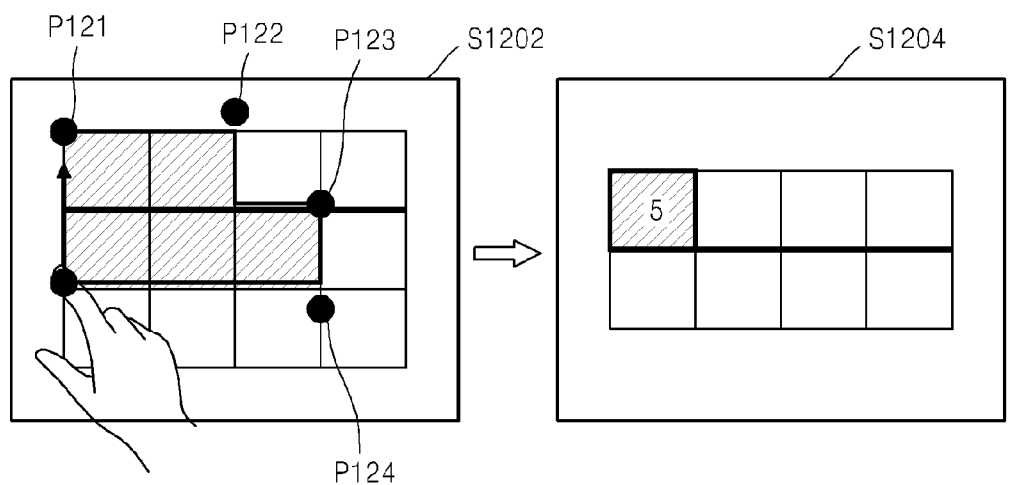
FIG. 16 includes pictorial diagrams illustrating an operation of grouping menu items.

FIG. 16 illustrates an operation of grouping menu items.

According to an embodiment of the invention, a user may group some desired menu items by using a gesture of drawing a loop around the some menu items. For example, the user may make a touch screen input of drawing a loop through positions P121, P122, P123, P124, P125, and P121 in operation S1202, to group the menu items within the loop in operation S1204. When a plurality of menu items are grouped, the grouped menu items may be displayed on one area within a lattice in which the menu items are arranged, in operation S1204. Alternatively, the user may designate a loop through a touch screen input of sequentially selecting the positions P121, P122, P123, P124, P125, and P121, and group the menu items within the loop.

Figure 17:
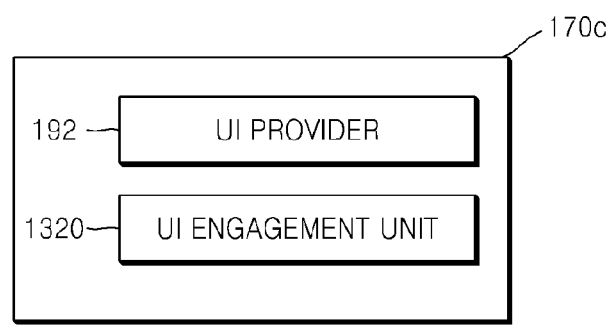
FIG. 17 is a block diagram of a CPU/DSP according to an embodiment.

FIG. 17 is a block diagram of a CPU/DSP 170c according to another embodiment of the invention.

Referring to FIG. 17, the CPU/DSP 170c may include the UI provider 192 and a UI engagement unit 1320. When the digital photographing apparatus 100 is connected to another electronic device to communicate with the electronic device, the UI engagement unit 1320 provides a lattice-shaped UI provided by the digital photographing apparatus 100 to the electronic device and engages both the UIs of the digital photographing apparatus 100 and the electronic device with each other.

FIG. 18 illustrates a process in which UIs are engaged with one another by the UI engagement unit 1320.

The digital photographing apparatus 100 may be engaged with various electronic devices such as a mobile device 1410 (for example, a PMP or a tablet PC) and a personal computer 1420. When the digital photographing apparatus 100 is engaged with another electronic device, a UI may be provided to both the digital photographing apparatus 100 and the electronic device. The user may control the digital photographing apparatus 100 by using a user interface in the digital photographing apparatus 100 or by using the electronic device. When the user manipulates a UI by using one of the digital photographing apparatus 100 and the electronic device, the user's manipulation is reflected to the other. In other words, a UI provided by the digital photographing apparatus 100 is engaged with a UI provided by the electronic device.

According to embodiments of the invention, a user can easily recognize the photographing setting values that change correspondingly, to increase user convenience.

According to embodiments of the invention, a user can recognize photographing setting values that can be set in a current mode and photographing setting values that cannot be set in the current mode.

According to embodiments of the invention, a UI through which a user can recognize and adjust all photographing setting values is provided. The invention can be embodied as a computer-readable recording medium which stores computer readable codes. The computer-readable recording medium is any data storage device that can store data which can be thereafter read by a computer system.

The computer-readable codes are used to perform operations of implementing a digital photographing apparatus controlling method according to the invention when the computer-readable codes are read from the computer-readable recording medium and executed by a processor (for example, the CPU/DSP 170a). The computer-readable codes can be implemented with various programming languages. Functional programs, codes, and code segments for accomplishing embodiments of the invention can be easily programmed by one of ordinary skill in the art to which the invention pertains.

Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer readable codes are stored and executed in a distributed fashion.

The invention has been described by referring to exemplary embodiments. While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated as incorporated by reference and were set forth in its entirety herein.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of controlling a digital photographing apparatus, the method comprising:
   displaying on a preview image a plurality of first menu items that respectively show a plurality of numerical candidate setting values to set a plurality of first group photographing setting values respectively;
   when a first group photographing setting value corresponding to the first menu item selected by a user is changed, changing and displaying at least one other first group photographing setting value which is correspondingly changed with the changed first group photographing setting value;
   providing a plurality of second menu items that enable second group photographing setting values each having a plurality of selectable candidate setting values to be set;
   providing a combination of the first menu items and the second menu items in a lattice form; and
   adjusting a number of the first menu items and the number of the second menu items, in response to an input of dragging corners of an outer edge of a lattice in which the first menu items and the second menu items are arranged,
   wherein the plurality of numeral candidate setting values are displayed as a sequential list.

2. The method of claim 1, further comprising:
   changing a size of a first menu item or a second menu item selected from the first menu items and the second menu items in response to an input of dragging corners of the selected first or second menu item; and
   relocating first menu items and second menu items except for the selected first or second menu item.

3. The method of claim 1, further comprising:
   deleting a first menu item or a second menu item selected from the first menu items and the second menu items in response to an input of dragging the selected first or second menu item to an outside of the lattice; and
   relocating first menu items and second menu items except for the deleted first or second menu item.

4. The method of claim 1, further comprising changing a location of a first menu item or a second menu item selected from the first menu items and the second menu items in response to an input of dragging the selected first or second menu item to another location on the lattice.

5. The method of claim 1, further comprising giving an attribute input by a user to an arrangement of the first menu items and the second menu items and storing the arrangement with the attribute.

6. The method of claim 1, further comprising grouping first menu items and second menu items included in a loop according to a user input of dragging in the form of the loop.

7. A digital photographing apparatus comprising:
   a user interface (UI) provider which provides menu items for setting photographing setting values to a preview image; and
   a photographing unit which adjusts the photographing setting values of the menu items according to a user input,
   wherein the UI provider is configured to:
   provide on a preview image a plurality of first menu items that enable a plurality of first group photographing setting values each having numerically-displayed candidate setting values to be set and that correspondingly change so that another first group photographing setting value is automatically changed according to adjustment of a first group photographing setting value;
   when a first group photographing setting value selected by a user from among the plurality of first group photographing setting values is changed, change another first group photographing setting value correspondingly with the first group photographing setting value selected by the user;
   when the selected first group photographing setting value and the other first group photographing setting value, which correspondingly changes, are changed, display a process in which first menu items corresponding to the changed first group photographing setting values are changed;
   provide a plurality of second menu items that enable second group photographing setting values each having a plurality of selectable candidate setting values to be set, and
   provide a combination of the first menu items and the second menu items in a lattice form,
   wherein the UI provider comprises number-of-menu items adjuster which adjusts a number of the first menu items and a number of the second menu items in response to an input of dragging corners of an outer edge of a lattice in which the first menu items and the second menu items are arranged, and
   each of the plurality of first menu items is configured as a sequential list of a plurality of candidate setting values of the first group photographing setting value that is set through the each of the first menu items.

8. The digital photographing apparatus of claim 7, wherein the UI provider further comprises a menu item arrangement corrector which changes a size of a first menu item or a second menu item selected from the first menu items and the second menu items in response to an input of dragging corners of the selected first or second menu item and relocates first menu items and second menu items except for the selected first or second menu item.

9. The digital photographing apparatus of claim 7, wherein the UI provider further comprises a menu item arrangement corrector which deletes a first menu item or a second menu item selected from the first menu items and the second menu items in response to an input of dragging the selected first or second menu item to an outside of the lattice and relocates first menu items and second menu items except for the deleted first or second menu item.

10. The digital photographing apparatus of claim 7, wherein the UI provider further comprises a menu item arrangement corrector which changes a location of a first menu item or a second menu item selected from the first menu items and the second menu items in response to an input of dragging the selected first or second menu item to another location on the lattice.

11. The digital photographing apparatus of claim 7, wherein the UI provider further comprises a menu item configuration storage unit which gives an attribute input by a user to an arrangement of the first menu items and the second menu items and stores the arrangement with the attribute.

12. The digital photographing apparatus of claim 7, wherein the UI provider further comprises a menu item grouping unit which groups first menu items and second menu items included in a loop according to a user input of dragging the first and second menu items to draw the loop.

13. A non-transitory computer-readable recording medium for storing computer program codes for executing a method of controlling a digital photographing apparatus, the method comprising:

displaying on a preview image a plurality of first menu items that respectively show a plurality of numerical candidate setting values to set a plurality of first group photographing setting values respectively;

when a first group photographing setting value corresponding to the first menu item selected by a user is changed, changing and displaying at least one other first group photographing setting value which is correspondingly changed with the changed first group photographing setting value;

providing a plurality of second menu items that enable second group photographing setting values each having a plurality of selectable candidate setting values to be set;

providing a combination of the first menu items and the second menu items in a lattice form; and adjusting a number of the first menu items and the number of the second menu items, in response to an input of dragging corners of an outer edge of a lattice in which the first menu items and the second menu items are arranged, wherein the plurality of numeral candidate setting values are displayed as a sequential list.

* * * * *